March 18, 1941.  C. W. SHORT  2,235,688
METHOD AND APPARATUS FOR MAKING ELECTRICAL CABLES
Filed Sept. 6, 1935  2 Sheets-Sheet 2
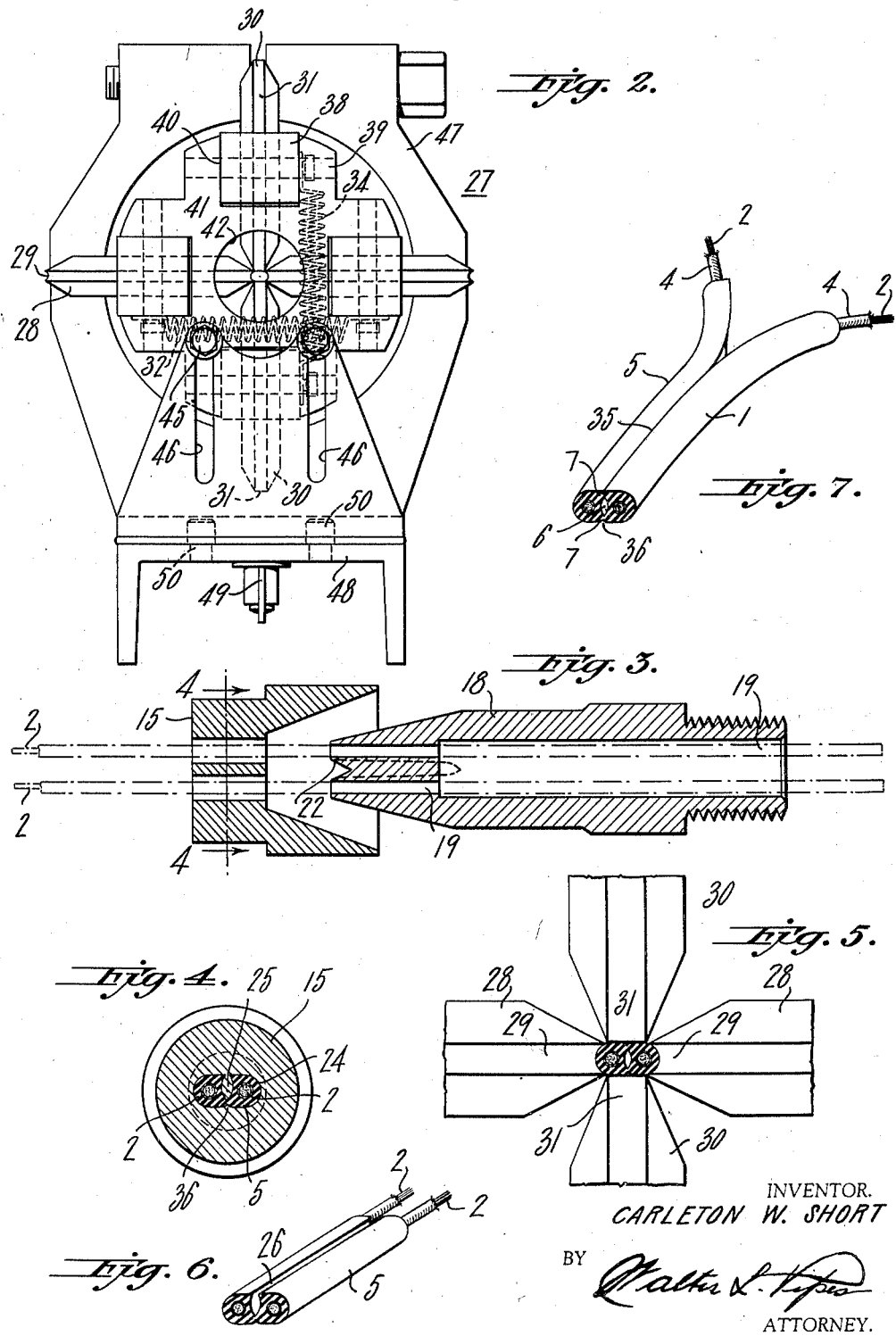
INVENTOR.
CARLETON W. SHORT
BY
ATTORNEY.

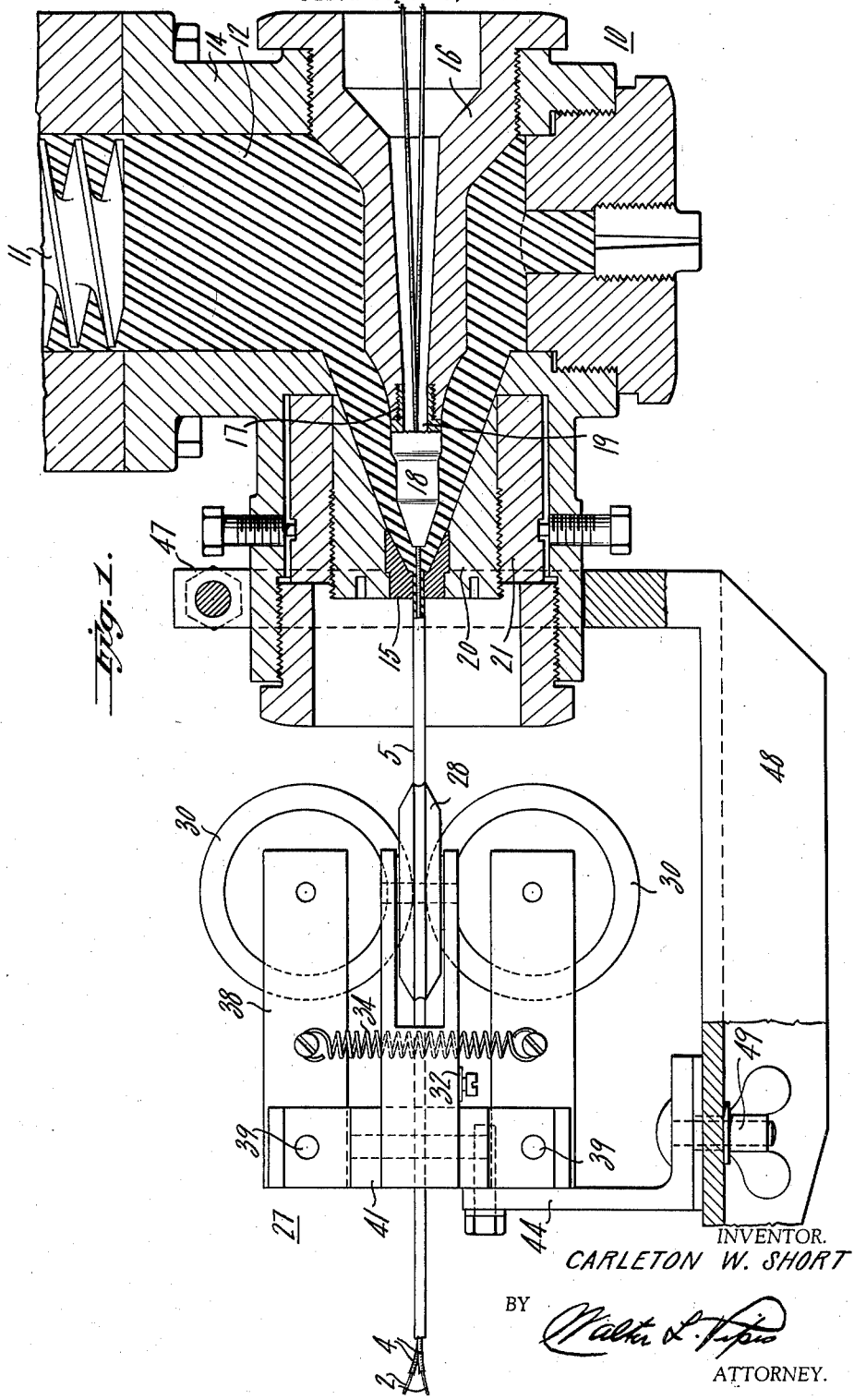

Patented Mar. 18, 1941

2,235,688

UNITED STATES PATENT OFFICE 2,235,688

METHOD AND APPARATUS FOR MAKING ELECTRICAL CABLES

Carleton W. Short, East Providence, R. I., assignor, by mesne assignments, to United States Rubber Company, New York, N. Y., a corporation of New Jersey Application September 6, 1935, Serial No. 39,439

12 Claims. (Cl. 18—13)

My invention relates to methods and apparatus for making electrical cables, and more particularly to the manufacture of that type of cable or cord having a space formed in the insulating material between a pair of electrical conductors so that the electrical conductors may be separated without injury to the immediately adjacent insulating material.

The present application constitutes an improvement over the disclosure in the Short et al. Letters Patent No. 1,984,038, dated December 11, 1934.

The electrical cable disclosed in the Letters Patent to Short et al. utilizes a strip of non-conducting material inserted in the insulating rubber between a pair of electrical conductors to permit their separation without destroying the insulating value of the insulating material between and immediately adjacent to each of the conductors. An electrical cable in which a continuous air chamber or space is provided in the insulated material between the conductors is on the market. The present application relates to the manufacture of such cable.

In the method and apparatus of the present application the electrical conductors are embedded in a unitary body in the insulating material in an extruding die, but a recess is formed in the insulating material which extends inwardly from one surface between and past a pair of conductors. After leaving the extruding die the recess is closed to form a continuous chamber or space in the insulating material between the conductors. I have found that by closing the edges of the recess after the cable leaves the extruding die, a more uniform chamber or space is provided in the cable than is obtained where an entire cable is shaped in the extruding die.

The accompanying drawings illustrate an electrical cable and apparatus for and method of making the same, in which—

Fig. 1 is a longitudinal view, partly in section, of an extruding head and a closing device for forming electrical cables in accordance with the present invention;

Fig. 2 is an end view of the closing device;

Fig. 3 is a longitudinal sectional view of the extruding die and conductor guide;

Fig. 4 is a transverse sectional view thereof, taken on the section line 4—4 of Fig. 3;

Fig. 5 is an enlarged view illustrating the closing operation;

Fig. 6 is a perspective view of a fragment of the cable after it leaves an extruding die; and Fig. 7 is a similar view showing the cable after it has passed through the extruding device.

The present invention is particularly directed to methods and apparatus for making the multiple conductor cable or cord 1 shown in Fig. 7. This cable comprises parallel electrical conductors 2 having one or more servings of cotton or other thread 4 embedded in a unitary body of insulating material 5. The insulating material between the conductors 2 is interrupted by a longitudinally extending fluid chamber 6. The width of the insulating material 5 along the medial plane of the cable is greater than the length of the chamber 6 so that portions 7 of the insulating material are disposed beyond the edges of the chamber and serve as bonds between the insulating material on the opposite sides of the chamber 6. It is to be understood that the cross-sectional shape of the chamber 6 may be varied within the scope of the present invention.

While various types of material may be used for the insulating material 5, rubber or rubber composition is particularly suitable for the purposes of this invention, both because rubber has well known and suitable electrical characteristics and also because the rubber may be applied to the conductors by an extruding or tubing machine.

When it is desired to separate the conductors 2 for the purpose of making electrical connections they are pulled apart, as shown at the upper end of Fig. 7. When the conductors are thus separated the strips 7 at the edges of the chamber 6 are severed and the insulating material immediately surrounding the conductors 2 is separated without tearing, as shown.

This cable is preferably made in the conventional extruding or tubing machine 10, as shown in Fig. 1. This machine is provided with a worm 11 for forcing insulating material, usually rubber, into a passageway 12 in a cross-head 14. The tubing machine, except for the die 15, is similar to the tubing machine shown in the United States Letters Patent No. 1,984,038 and, accordingly, a detailed description thereof is omitted. The die 15 is in alignment with a guide holder 16 having a threaded end 17 for the reception of a guide tube 18 having openings 19 through which the conductors are fed.

The die 15 is secured to a die holder 20 which, in turn is threaded into a collar 21 secured in the crosshead 14 in the conventional manner. With this construction the guide tube 18 terminates at a distance from the die 15.

Referring particularly to Fig. 3, the guide tube 18 is spaced a distance from the die 15 and the tube 18 is provided with a notch 22 at its forward end so that the rubber is tightly compacted around the conductors 2 and their coverings as they enter the die 15.

As is particularly shown in Figs. 3 and 4, the die 15 is provided with an opening 24 of a generally oval shape for receiving the conductors 2 and centering them in a unitary body of insulating material 5. A flange or rib 25 projects inwardly of the opening 24 between and past the conductors 2, so that the insulating material 5 is provided with a recess 26, illustrated in Fig. 6, as it emerges from the die 15. A portion of the recess 26 ultimately forms the chamber 6 in the cable upon bringing the edges of the recess together along the surface of the cable.

The mechanism 27 for closing the edges of the recess 26 is preferably disposed near the die 15, although the incompleted conductor may be carried some distance from the tubing machine 10 to the closing apparatus 27, if desired. The apparatus 27 comprises a pair of pressure wheels 28 having their peripheries provided with grooves 29 conforming to the rounded edges of the finished cable and another pair of pressure wheels 30 having flat faces 31 for engaging the flat sides of the cable, as is particularly shown in Fig. 5. The surface configurations of the wheels 28 and 30 may be varied as desired. The pairs of wheels 28 and 30 are pressed together by springs 32 and 34, respectively, so that a yielding pressure is applied to the cable. As the cable passes between the pressure wheels, the edges of the recess 26 are brought together and it is closed to form the chamber 6, as shown in Fig. 7. As the closing of the recess 26 is apt to produce a seam line 35 on one side of the cable, the other side is scored, as at 36, by the die 15 to produce a balanced appearance.

Each pressure wheel is mounted on an arm 38 which is pivoted at 39 in a recess 40 in a common block 41. The block 41 has an opening 42 through which the finished cable passes without engagement. The block 41 is secured to a bracket 44 by set screws 45 extending through slots 46 whereby the position of the block may be adjusted.

The bracket 44 may be mounted on any suitable base, although for convenience I prefer to mount it in close proximity to the tubing machine 10. For this purpose a clamp 47 is passed around the discharge orifice of the tubing machine. The clamp 47 is provided with a forwardly projecting plate 48 to which the bracket 44 is secured by a set screw 49. Positioning pins 50 may be provided for holding the bracket 44 in alignment with the plate 48 if desired.

After leaving the closing device 27, the wire may be vulcanized in any suitable manner.

In the manufacture of the cable 1 by the method and apparatus of the present invention, a continuous regular chamber 6 is formed in the conductor by closing the edges of a recess in the insulating material after it leaves the die. I have found that better results are obtained in the manufacture by providing a relatively large recess in the insulating material and then closing the recess, than by attempting to complete the chamber in the insulating material as it leaves the tubing machine.

While I have shown and described a present preferred embodiment of the apparatus embodying the invention and methods of practicing the invention, it is to be understood that various changes may be made in the apparatus and in the methods of forming the cable within the spirit of the invention and the scope of the appended claims.

Having thus described my invention, what I claim and desire to protect by Letters Patent is:

1. A method of making electrical cables having a plurality of parallel conductors enclosed in a unitary body of insulating material and having a chamber formed in the insulating material between a pair of conductors comprising simultaneously covering a plurality of electrical conductors with a unitary body of insulating material having a recess formed in the insulating material and extending inwardly from a surface thereof past and between a pair of conductors, and closing the recess at the edge of the cable to form a closed chamber in the insulating material between the conductors.

2. A method of making electrical cables having a plurality of parallel conductors enclosed in a unitary body of insulating material and having a chamber formed in the insulating material between a pair of conductors comprising passing a plurality of electrical conductors through an extruding machine and forming a unitary body of insulating material thereabout, said body of insulating material having a recess extending inwardly from the surface thereof past and between a pair of conductors, and closing the recess at the surface of the cable to form a closed chamber in the insulating material between the conductors.

3. A cable forming apparatus comprising a die having a passage therein for covering parallel electrical conductors with a unitary body of insulating material, said die having a member extending into said passage from a wall thereof and positioned to form substantially separate passages for the conductors, the portion of said member adjacent to the wall of said passage being thinner in the direction transverse to the axial direction of said passage than the adjacent portion extending into the passage so as to form a recess in the insulating material extending from a surface thereof between and past a pair of conductors, and means for bringing the edges of said recess together at the surface of the cable and permanently closing the recess to form a chamber in the insulating material.

4. A cable forming apparatus comprising a die having an opening for the passage of parallel electrical conductors and insulating material disposed therearound, said die having a member extending into said opening from a wall thereof and positioned to form substantially separate passages for the conductors, the portion of said member adjacent to said wall being thinner in the direction transverse to the axis of said opening than the adjacent portion extending into said opening so as to form a recess in the insulating material extending inwardly from a surface thereof between and past a pair of conductors, and means for receiving the cable from the die and pressing the edges of the recess together for forming a chamber within the cable.

5. A cable forming apparatus comprising a die having an opening for the passage of parallel electrical conductors and insulating material disposed therearound, said die having a member extending into said opening from a wall thereof and positioned to form substantially separate passages for the conductors, the portion of said member adjacent to said wall being thinner in the direction transverse to the axis of said opening than the adjacent portion extending into said opening so as to form a recess in the insulating material extending inwardly from a surface thereof and past a pair of conductors, and pressure wheels for receiving the cable from the die and pressing the edges of the recess together for forming a chamber within the cable.

6. A cable forming apparatus comprising a die having an opening for the passage of parallel electrical conductors and insulating material disposed therearound, said die having a member extending into said opening from a wall thereof and positioned to form substantially separate passages for the conductors, the portion of said member adjacent to said wall being thinner in the direction transverse to the axis of said opening than the adjacent portion extending into said opening so as to form a recess in the insulating material extending inwardly from a surface thereof and past a pair of conductors, and resilient pressure wheels for receiving the cable from the die and pressing the edges of the recess together for forming a chamber within the cable.

7. The method of making insulation covered duplex electrical conductor cord which embodies in the insulation material a passage extending longitudinally of the cord substantially parallel with the conductor wires of the cord and in spaced relation thereto, which method includes the steps of feeding spaced wires endwise through a die, simultaneously extruding a jacket of plastic material through said die and around each wire, and, as an incident to the extrusion operation, forming a longitudinally extending groove in each insulation jacket, and then guiding such insulation jacketed wires towards each other and bringing the grooved sides of the jackets into mutual registration while the jackets are in a plastic condition and thereby adhesively uniting the jackets with the registered grooves forming an internal longitudinal passage in the combined jackets.

8. In an extrusion apparatus for making separably plural-wire conductor cord of the class described, the combination of an extruding head provided with a die having a pair of relatively independent openings therein, means for guiding a pair of conductor wires through said die openings, means for moving and directing plastic insulation material through the die openings and around the wires as jackets thereon as they pass through the die openings, said openings having adjacent sides provided with means projecting into the respective openings for forming grooves in adjacent sides of the insulation material applied as jackets to said wires, and guiding means for engaging and guiding the jacketed wires toward each other and for bringing the jackets into mutual contact with their respective grooves registering with each other while the jackets are plastic to thereby adhesively unite the same, said guiding means being spaced outwardly from the die to permit atmospheric air to enter the grooves which form the longitudinal passage in the duplex conductor cord.

9. The method of making divisible insulation covered electrical cable which comprises the steps of feeding spaced metallic conductors endwise and in substantially parallel spaced relation to each other through a die, simultaneously extruding plastic material around each conductor and through the die, forming a longitudinal cleft provided with overhanging separated outer edges in the insulation between the conductors, and bringing said edges together in a plastic condition and thereby uniting them so as to form an internal longitudinal passage in the insulation.

10. The method of making divisible insulation covered electrical cable which comprises the steps of feeding spaced metallic conductors endwise and in substantially parallel spaced relation to each other through a die, simultaneously extruding plastic material around each conductor and through the die, forming a longitudinal cleft provided with overhanging separated outer edges in the insulation between the conductors, admitting a gas to the surface of said cleft so as to reduce the adhesiveness of such surfaces, and bringing said edges together in the less adhesive condition and thereby forming a longitudinal passage in the insulation and a bond between said edges which is cohesively weaker than the remainder of the insulation.

11. In an extrusion apparatus for making divisible insulation covered electrical cable, the combination of an extruding head and a die, said die having a pair of relatively independent openings therein, means for guiding a pair of conductors endwise through said die openings, means for extruding plastic insulation material around the conductors and through said openings, a rib interposed between said die openings and supported by the walls thereof, said rib having surfaces projecting into said die openings to form a cleft having overhanging separated edges in the insulation coming in contact therewith, and means for bringing the edges of said cleft together in a tacky condition to unite them and form a longitudinal passage in the insulation, said means for bringing said edges together being spaced outwardly from the die to permit atmospheric air to enter the cleft and the longitudinal passage in the insulation.

12. In an extrusion apparatus for making divisible insulation covered electrical cable, the combination of an extruding head and a die, said die having a pair of relatively independent openings therein, means for guiding a pair of conductors endwise through said die openings, means for extruding plastic insulation material around the conductors and through said openings, a rib interposed between said die openings and supported by the walls thereof, said rib having surfaces projecting into said die openings to form a cleft having overhanging separated edges in the insulation coming in contact therewith, means for exposing the surfaces of said cleft to a gas, and means for bringing the edges of said cleft together in a tacky condition to unite them and form a longitudinal passage in the insulation.

CARLETON W. SHORT.